United States Patent [19]

Emery et al.

[11] Patent Number: 5,179,141
[45] Date of Patent: Jan. 12, 1993

[54] PRODUCING ADHESIVELY EDGE-PADDED PAPER TABLETS WITH A FAST-DRYING LATEX ADHESIVE

[75] Inventors: Clair J. Emery, Maplewood; Kenneth J. Perrington, Woodbury, both of Minn.

[73] Assignee: Minnesota Mining and Manufacturing Company, Saint Paul, Minn.

[21] Appl. No.: 816,773

[22] Filed: Jan. 2, 1992

Related U.S. Application Data

[63] Continuation of Ser. No. 405,190, Sep. 11, 1989, abandoned.

[51] Int. Cl.$^5$ .............. C08L 1/00; C09J 4/00; C09J 5/00
[52] U.S. Cl. .......................... 524/30; 524/27; 524/35; 524/44; 156/325; 156/326; 156/327; 156/328; 156/908; 427/284; 427/285
[58] Field of Search ............. 524/30, 27, 35, 44; 156/908, 325-328; 282/DIG. 2, 26; 427/284, 285

[56] References Cited

U.S. PATENT DOCUMENTS

| | | | |
|---|---|---|---|
| 2,459,955 | 1/1949 | Morrison et al. | 524/296 |
| 3,963,553 | 6/1976 | Kiritani et al. | 156/305 |
| 4,217,162 | 8/1980 | Glanz et al. | 428/194 |
| 4,230,514 | 10/1980 | Becker et al. | 428/194 |
| 4,290,433 | 9/1981 | Becker | 524/389 |
| 4,418,941 | 12/1983 | Fuchigami et al. | 428/194 |
| 4,571,412 | 2/1986 | Minamida et al. | 524/64 |
| 4,702,496 | 10/1987 | Hume, III | 156/321 |
| 4,714,723 | 12/1982 | Hoppe et al. | 524/42 |
| 4,769,096 | 9/1988 | Vander Giessen et al. | 156/69 |

OTHER PUBLICATIONS

"Airflex 300 Base for Adhesives," Air Products and Chemicals, Inc., Polymers and Chemicals Division, 7201 Hamilton Road, Allentown, PA 19195.
"Dow Designed Latexes for Specialty Applications," Form No. 191-193-86 from Dow Midland, MI 48674.
"Fundamentals of Organic Chemistry", C. David Gertsche, Daniel J. Pasto, 1975, Prentice-Hall International, Inc., pp. 274-276.

*Primary Examiner*—John Kight, III
*Assistant Examiner*—P. Hampton-Hightower
*Attorney, Agent, or Firm*—Gary L. Griswold; Walter N. Kirn; Dale A. Bjorkman

[57] ABSTRACT

A latex adhesive made from a polymer such as a ethylene/vinyl acetate or styrene/butadiene copolymer, a low-boiling alcohol, such as isopropanol, a non-crystallizing polyhydric alcohol such as sorbitol, and preferably a cellulose thickener. The latex adhesive dries so quickly that an adhesively edge-padded stack of paper sheets formed using the adhesive can be cut by hand into tablets within about 30 minutes. These tablets do not leave an upstanding ridge of adhesive when a number of the sheets are torn off.

18 Claims, No Drawings

PRODUCING ADHESIVELY EDGE-PADDED PAPER TABLETS WITH A FAST-DRYING LATEX ADHESIVE

This is a continuation of application Ser. No. 07/405,190 filed Sep. 11, 1989 now abandoned.

BACKGROUND OF THE INVENTION

1. Field of the Invention

The invention concerns the production of paper tablets by adhesively edge-padding a stack of paper with a latex adhesive and, after allowing the adhesive to dry, cutting the stack into individual tablets. The term "tablet" is here used to encompass books, reports, ledgers, and the like.

2. Description of the Related Art

Paper tablets can be assembled by brushing an adhesive onto one edge of a stack of paper. Usually, the stack includes a piece of chipboard (cardboard) that forms the base of each tablet. After the adhesive has dried, the stack is cut by hand with a knife at the underside of each piece of chipboard to produce individual tablets, each of which has an adhesive edge-padding.

In use, individual sheets of the tablet can be successively peeled from the adhesive edge-padding and sometimes are torn in doing so. The removal of a number of sheets typically leaves an upstanding ridge of the adhesive edge-padding which gradually becomes unsightly due to fragments of torn sheets and also due to pieces of the upstanding ridge breaking off from time to time. When a piece of the ridge is torn off, it sometimes carries with it part of the edge-padding for the underlying sheets, thus exacerbating the unsightliness of the tablet and sometimes causing the remaining sheets to become loose.

Three of the leading adhesives for making adhesively edge-padded tablets are "Merit" padding adhesive from Merrit Products Co., Painesville, Ohio; "Hurst Graphics" padding compound from Hurst Graphics, Los Angeles, Calif.; and "Champadco" padding cement from Champion Mfg. Co., Charlotte, N.C. Each of these is believed to be a latex based upon polyvinyl acetate containing a plasticizer such as an ortho-phthalate ester and a viscosity-modifying agent. While claims have been made that such edge-padding adhesives dry within about one-half hour, it has been found that when used to form a stack of paper tablets, such edge-paddings require overnight drying before the stack is cut into individual tablets. Any effort to cut the stack sooner tends to cause the adhesive edge-padding to gum up, making it impossible to keep the knife from veering off. Such drying time virtually precludes large-scale manufacture, because of the large space that would be required for allowing the stacks to dry.

Because of the foregoing problems, the edges of many paper tablets are bound like paperback books, and the sheets are perforated to permit individual removal. Such tablets are not only more expensive to assemble, but there is waste in the portions of the paper sheets that remain with the binding.

3. Other Prior Art

A large number of latex adhesives are based on ethylene/vinyl acetate (EVA) copolymer which is inexpensive and can be compounded with inexpensive materials to form strong bonds to a great variety of substrates. For a discussion of EVA copolymers, see a brochure entitled "Airflex 300 Base for Adhesives" from Air Products and Chemicals, Inc., 1980. That brochure says that "Airflex" 300 is an EVA copolymer and lists 22 uses including "Bookbinding" and "Padding". It teaches that the viscosity of an EVA latex can be increased with additives such as cellulosic thickeners and plasticizers such as dibutyl phthalate; that plasticizers also improve specific adhesion; that wet tack can be enhanced by adding tackifying resins; and that the setting speed of the latex "can be improved by adding plasticizer, solvents or tackifying resins."

For, a discussion of styrene/butadiene (SB) copolymers, see a brochure entitled "Dow Designed Latexes For speciality Applications," Form No. 191-193-86 from Dow Chemical Co.

We are not aware of any latex adhesive that is based on either EVA or SB copolymer and is specifically formulated and marketed for adhesively edge-padding paper tablets.

SUMMARY OF THE INVENTION

The invention provides what is believed to be the first edge-padding adhesive that dries so quickly that an adhesively edge-padded stack of paper sheets can be easily cut by hand into tablets within about 30 minutes. Furthermore, the invention provides what is believed to be the first adhesively edge-padded tablet that does not leave an upstanding ridge of adhesive when a number of the sheets are torn off, thus avoiding the problem of unsightliness discussed above.

Briefly, the invention concerns the production of paper tablets by 1) adhesively edge-padding a stack of paper with a latex adhesive which has a viscosity at room temperature of from about 600 to about 8000 cps (Brookfield Spindle #6, 100 rpm) and comprises by weight:
   a) from about 25 to about 40 parts (dry basis) of a latex of a polymer having a Tg from $-10°$ to $30°$ C., which latex when blended with a non-crystallizing polyhydric alcohol is film-forming,
   b) from about 10 to about 22 parts of at least one low-boiling alcohol,
   c) from about 3 to about 9 parts of at least one non-crystallizing polyhydric alcohol, and
   d) water in an amount to provide 100 parts of ingredients a) through d), and 2) allowing the applied latex adhesive to dry.

In order to achieve a viscosity of at least 600 cps, it may be necessary for the latex adhesive to include at least about 0.1 part of a cellulose thickener, the presence of which enables the desired viscosity to be achieved at relatively low amounts of polymer, thus keeping the cost of the latex adhesive at a minimum. Furthermore, the presence of a cellulose thickener affords increased adhesion. Usually, the desired viscosity can be attained by using up to 1.5 parts of cellulose thickener, but greater amounts may be necessary when a less efficient cellulose thickener is used. Preferred cellulose thickeners include hydroxyethyl cellulose, carboxymethyl cellulose, and hydroxypropyl cellulose. The first of these is available at moderate cost as "Natrosol" from Aqualon, USA.

Preferred as the latex are EVA and SB copolymers, both of which afford latex adhesives of the invention that when used to form edge-padded tablets afford fast drying and excellent adhesion. Each also is inexpensive and readily available commercially. Other useful polymers include polyvinyl acetate, butadiene/vinyl toluene copolymers, and styrene/isoprene copolymers.

DETAILED DISCLOSURE

Preferably, the viscosity at room temperature of the latex adhesive is from about 1000 to about 5000 cps so that it flows smoothly onto the edge of the stack of paper, readily penetrates between adjacent sheets, and leaves such a thin spine on the edge of the stack that the spine is carried off as each sheet is removed. Hence, a partially used tablet has no upstanding ridge of dried adhesive such as occurs in adhesively edge-padded tablets of the prior art. If the viscosity were substantially above 5000 cps, such a ridge might develop. On the other hand, if the viscosity were substantially below 1000 cps, the latex adhesive can tend to penetrate too far into the stack and thus fail to ensure the integrity of the tablet in ordinary shipment and handling. If the dried latex adhesive did afford sufficient integrity even though the latex penetrated far into the stack, it might result in tearing of the sheets upon their individual removal.

When the polymer solids provide substantially less than 25% by weight of the latex adhesive, the dried adhesive tends to be deficient in adhesion to paper. At amounts greater than 35% by weight, adhesion to paper is not appreciably increased, and because the polymer is more expensive than the other ingredients, the cost of the latex adhesive would be increased without any offsetting advantage. If the polymer solids were to provide substantially more than 40% by weight of the latex adhesive, it would be difficult to keep the viscosity below 8000 cps at room temperature, thus resulting in an overly thick spine and a tendency to leave an undesired ridge as sheets are removed.

For purposes of this invention, low boiling alcohols can be considered those having a boiling point below about 120° C.

Preferred low-boiling alcohols are isopropanol and ethanol. N-propanol also is useful, but more expensive than isopropanol and ethanol. Methyl alcohol would be equally useful were it not toxic. Mixtures of such alcohols are also useful.

Because the low-boiling alcohol reduces viscosity and surface tension, it allows the latex adhesive to penetrate into a paper stack without leaving such a thick spine that a ridge would be created upon removal of sheets of paper from an edge-padded tablet. For this reason, the low-boiling alcohol preferably is used in as large a quantity as possible as long as it does not cause any precipitation of the latex. The use of such alcohols in amounts above about 22% by weight of the latex adhesive might cause the latex adhesive to agglomerate. At amounts below about 10%, the desirably fast drying would not be achieved, and the edge-paddings might be so stiff and brittle as to allow the edge-padded stack to delaminate under shock.

While not completely understanding the phenomenon, it is theorized that the non-crystallizing polyhydric alcohol acts as a plasticizer and, in doing so, improves the adhesive strength and also reduces the freezing point of the latex adhesive This can make it unnecessary to employ heating when shipping the latex adhesive in cold temperatures. Unlike many conventional plasticizers, the polyhydric alcohols can be used without any environmental concerns.

A preferred non-crystallizing polyhydric alcohol is sorbitol. Noncrystalline forms of sorbitol are "Sorbo", "Sorbitol Special", and "Arlex," each of which is available from ICI Americas. Other useful non-crystallizing polyhydric alcohols include pentaerythritol, glycerol, propylene glycol, and low-molecular-weight polyethylene glycol.

Testing indicates that dibutyl phthalate can be substituted into the latex adhesive in place of part of the non-crystallizing polyhydric alcohol, with little or no sacrifice in qualities, but dibutyl phthalate is a suspected carcinogen. Similarly, it also has been demonstrated that diethyl phthalate can be substituted for part of the non-crystallizing polyhydric alcohol, but its use may give rise to environmental concerns.

When the amount of non-crystallizing polyhydric alcohol is substantially more than 9% by weight of the latex adhesive, the dried adhesive tends to be deficient in adhesion. At amounts substantially below 3%, the dried adhesive tends to be undesirably stiff and brittle.

ADHESION VALUE

"Adhesion Value" is obtained using a paper tablet of 8½ × 11 inches (21.6 × 27.9 cm) which is broken apart halfway down the padded edge, forming two smaller tablets. From the lower tablet, approximately eight sheets are torn off before subjecting the next ten consecutive sheets to the following test. A tension measurement device, namely the "Digital Force Gauge Model DFGRS50" from Chatillon is used to measure "Adhesion Values" in Newtons (N). With the unpadded end of the top sheet of the tablet placed in the clamp of the force gauge, the center of the unpadded end of the tablet is gripped by one's thumb, fingers, and palm of one hand and pulled slowly until the bond fails. The adhesion value is the average of ten results, reported in Newtons (N).

An adhesion of at least about 30 Newtons has been found sufficient to allow integrity of the pad and yet not exhibit excessive ridge build up of the spine, with at least about 45 Newtons being preferred. Increasing adhesion will correspondingly tend to increase ridge formation and delamination of the paper, and thus an upper limit is in reality dependent on the paper used to form the tablet.

CELLULOSE THICKENERS

Used in the examples were the following cellulose thickeners:

| Trade Name | Source |
|---|---|
| "Natrosol" 250HBR and 250H4BR hydroxyethyl cellulose | Aqualon USA |
| "Tixogel" LX bentonite clay gellant | United Catalysts, Inc. |
| "CMC" MT carboxymethyl cellulose | Aqualon USA |

In the following examples, all parts are by weight.

EXAMPLE 1

A latex adhesive was made having the following composition:

PARTS 60.010 "Airflex" 300 EVA copolymer, Tg=18° C.
13.010 ethyl alcohol
6.010 "Sorbitol Special", a polyhydric alcohol
0.410 "Natrosol" 250HBR, hydroxyethyl cellulose
20.610 water The adhesive was brushed by hand onto one of the short sides of a stack of paper sheets of 8½×11 inches (21.6×27.9 cm). After drying for about 30 minutes, the stack was cleanly cut apart with a sharp knife into individual tablets. The spine of the adhesive edge-padding of each tablet had a substantially uniform thickness of about 0.2–0.3 mm, and adhesive had penetrated about 0.15 mm into the stack. Individual sheets were stripped cleanly from the top of the stack without tearing, leaving behind only occasional vestiges of an upstanding ridge of adhesive, and each such vestige would disappear before more than three or four additional sheets had been torn off. The adhesion value was 81 N.

EXAMPLES 2–7

A series of tablets were made as in Example 1 except substituting isopropyl alcohol for the ethyl alcohol and, in Examples 3–7, substituting other polyhydric alcohols for the "Sorbitol Special" as indicated in Table I. The adhesion value (N) is also reported.

TABLE I

| Example | Polyhydric alcohol | Adhesion Value (N) |
|---|---|---|
| 2 | "Sorbitol Special" | 69 |
| 3 | "Arlex" sorbitol | 71 |
| 4 | mannitol | 55 |
| 5 | glycerol | 56 |
| 6 | 1,2-propanediol | 61 |
| 7 | polyethylene glycol (300 MW) | 49 |

EXAMPLES 8–14

A series of tablets were made as in Examples 1–7, except substituting "Airflex" 100 HS EVA copolymer (Tg=5° C.) for "Airflex" 300 EVA copolymer. In Examples 8–14, polyhydric alcohol levels were maintained at 5 percent by weight of the latex adhesive. The levels of low-boiling alcohol and thickening agents were as in Examples 1–7. Adhesion values (N) for Examples 8–14 are reported in Table II.

TABLE II

| Example | Polyhydric Alcohol | Low Boiling Alcohol | Adhesion Value (N) |
|---|---|---|---|
| 8 | "Sorbitol Special" | ethanol | 49 |
| 9 | "Sorbitol Special" | isopropanol | 42 |
| 10 | "Arlex Sorbitol" | isopropanol | 45 |
| 11 | mannitol | isopropanol | 44 |
| 12 | glycerol | isopropanol | 42 |
| 13 | 1,2-propanediol | isopropanol | 42 |
| 14 | polyethylene glycol (300 MW) | isopropanol | 45 |

EXAMPLES 15–16

Tablets were made as in Example 2 except using different cellulose thickeners in amounts indicated in Table III and reducing the amounts of water to compensate for increased amounts of the thickener. Table III also includes Example 2 for comparison:

TABLE III

| Example | Cellulose Thickener | Parts | Adhesion Value (N) |
|---|---|---|---|
| 2 | "Natrosol" 250 HBR | 0.4 | 69 |
| 15 | "Tixogel" LX | 0.8 | 64 |
| 16 | "CMC" MT | 1.0 | 60 |

The latex adhesive of Example 15 was found to be lumpy.

EXAMPLE 17

Tablets were made as in Example 2 except using a latex adhesive of the following composition:

Parts 60.010 "Airflex" 300 EVA copolymer, Tg=18° C.
13.010 ethyl alcohol
6.010 "Sorbitol Special", a polyhydric alcohol
0.410 "Natrosol" 250HBR, hydroxyethyl cellulose
20.610 water

EXAMPLES 18–20

Tablets were made as in Example 17 except for changes as indicated in Table IV. Example 17 is included in Table IV for comparison.

TABLE IV

| Example | Alcohol | Amt. | Plasticizer | Amt. | Cell. Thck. | Amt. | Water Amt. |
|---|---|---|---|---|---|---|---|
| 17 | iPrOH | 13.0 | "Sorb Spec" | 6.0 | HBR | 0.4 | 14.6 |
| 18 | EtOH | 13.0 | "Sorb Spec" | 6.0 | HBR | 0.4 | 14.6 |
| 19 | iPrOH | 14.6 | DBP | 2.0 | H4BR | 0.5 | 16.9 |
| 20 | iPrOH | 14.5 | DEP | 4.5 | H4BR | 0.5 | 14.5 | iPrOH = isopropyl alcohol
EtOH = ethyl alcohol
"Sorb Spec" = "Sorbitol Special"
DBP = dibutyl phthalate
DEP = diethyl phthalate
HBR = "Natrosol" 250HBR
H4BR = "Natrosol" 250H4BR Testing of the tablets of Examples 17–20 is reported in Table V.

TABLE V

| Example | Adhesion Value (N) |
|---|---|
| 17 | 71 |
| 18 | 48 |
| 19 | 60 |
| 20 | 59 |

What is claimed is:

1. A method for producing adhesively edge-padded tablets comprising the steps of:
   1) adhesively edge-padding a stack of paper with a latex adhesive which has a viscosity at room temperature of from about 600 to about 8000 cps and consists of by weight:
      a) from about 25 to about 40 parts (dry basis) of a latex of a polymer having a Tg from about −10° to about 30° C., which when blended with a non-crystallizing polyhydric alcohol is film-forming,
      b) from about 10 to about 22 parts of at least one low-boiling alcohol,
      c) from about 3 to about 9 parts of at least one non-crystallizing polyhydric alcohol, and
      d) water in an amount to provide 100 parts of ingredients a) through d), and
   2) allowing the applied latex adhesive to dry.

2. The method of claim 1 wherein said polymer is selected from EVA copolymers and SB copolymers.

3. The method of claim 1 wherein said polymer solids provide less than about 35% by weight of said latex adhesive.

4. The method of claim 1 wherein said latex adhesive comprises at least about 0.1 part of a cellulose thickener.

5. The method of claim 4 wherein said cellulose thickener comprises up to about 1.5 parts of said latex adhesive.

6. The method of claim 4 wherein said cellulose thickener is selected from hydroxyethyl cellulose, carboxymethyl cellulose, and hydroxypropyl cellulose.

7. The method of claim 1 wherein said low-boiling alcohol is selected from isopropanol and ethanol.

8. The method of claim 1 wherein said non-crystallizing polyhydric alcohol comprises sorbitol.

9. The method of claim 1 wherein a part of said non-crystallizing polyhydric alcohol is substituted by a plasticizer selected from dibutyl phthalate and diethyl phthalate.

10. The method of claim 1 wherein the viscosity of said latex adhesive at room temperature is from about 1000 to about 5000 cps.

11. A latex adhesive having a viscosity at room temperature of from about 600 to about 8000 cps and is useful for adhesively edge-padding a stack of paper that is to be cut into tablets, said latex adhesive consisting of by weight:
   a) from about 25 to about 40 parts (dry basis) of a latex of a polymer having a Tg from about $-10°$ to about $30°$ C., which latex when blended with a non-crystallizing polyhydric alcohol is film-forming,
   b) from about 10 to about 22 parts of at least one low-boiling alcohol,
   c) from about 3 to about 9 parts of at least one non-crystallizing polyhydric alcohol, and
   d) water in an amount to provide 100 parts of ingredients a) through d).

12. The latex adhesive of claim 1 wherein said polymer is selected from EVA copolymers and SB copolymers.

13. The latex adhesive of claim 1 having a viscosity at room temperature of from about 1000 to about 5000 cps.

14. The latex adhesive of claim 1 further comprising at least about 0.1 part of a cellulose thickener.

15. The latex adhesive of claim 14 wherein said cellulose thickener is selected from hydroxyethyl cellulose, carboxymethyl cellulose, and hydroxypropyl cellulose.

16. The latex adhesive of claim 1 wherein said low-boiling alcohol is selected from isopropanol and ethanol.

17. The latex adhesive of claim 1 wherein said non-crystallizing polyhydric alcohol comprises sorbitol.

18. A paper tablet having an adhesive edge-padding formed from the adhesive of claim 1.

* * * * *

UNITED STATES PATENT AND TRADEMARK OFFICE
CERTIFICATE OF CORRECTION

PATENT NO. : 5,179,141

DATED : January 12, 1993

INVENTOR(S) : Emery et al.

It is certified that error appears in the above-identified patent and that said Letters Patent is hereby corrected as shown below:

Col. 2, line 11, "For, a" should be --For a--.
Col. 2, line 48, "5 2)" should be --2)--.
Col. 4, lines 63-68 should be:

| Parts | |
|---|---|
| 60.0 | "Airflex" 300 EVA copolymer, Tg-18°C. |
| 13.0 | ethyl alcohol |
| 6.0 | "Sorbitol Special", a polyhydric alcohol |
| 0.4 | "Natrosol" 250HBR, hydroxyethyl cellulose |
| 20.6 | water |

Col. 6, lines 8-13 should be:

| Parts | |
|---|---|
| 66.0 | DL-238NA styrene/butadiene copolymer from Dow Chemical Co., Tg = 9°C |
| 13.0 | isopropyl alcohol |
| 6.0 | "Sorbitol Special" polyhydric alcohol |
| 0.4 | "Natrosol" 250HBR hydroxyethyl cellulose |
| 14.6 | water |

UNITED STATES PATENT AND TRADEMARK OFFICE
CERTIFICATE OF CORRECTION

PATENT NO.  : 5,179,141
DATED       : January 12, 1993
INVENTOR(S) : Emery et al It is certified that error appears in the above-indentified patent and that said Letters Patent is hereby corrected as shown below:

Claims 12-14 and 16-18 should depend from Claim 11 instead of claim 1.

Signed and Sealed this

Twenty-fourth Day of May, 1994

Attest:

BRUCE LEHMAN

Attesting Officer

Commissioner of Patents and Trademarks